(12) United States Patent
Khlat

(10) Patent No.: US 9,548,768 B2
(45) Date of Patent: Jan. 17, 2017

(54) RADIO FREQUENCY FRONT END CIRCUITRY FOR CARRIER AGGREGATION

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 14/955,461

(22) Filed: Dec. 1, 2015

(65) Prior Publication Data

US 2016/0233895 A1 Aug. 11, 2016

Related U.S. Application Data

(60) Provisional application No. 62/113,763, filed on Feb. 9, 2015.

(51) Int. Cl.
*H04M 1/00* (2006.01)
*H04B 1/00* (2006.01)
*H04B 1/40* (2015.01)
*H04W 88/06* (2009.01)

(52) U.S. Cl.
CPC ............. *H04B 1/0064* (2013.01); *H04B 1/40* (2013.01); *H04W 88/06* (2013.01)

(58) Field of Classification Search
CPC ........... H04B 1/0064; H04B 1/40; H04B 1/48; H04B 1/50; H04B 1/52; H04B 1/54; H04B 1/56; H04B 1/58; H04W 88/06
USPC ................................ 455/78, 552.1, 213, 339
See application file for complete search history.

(56) References Cited

U.S. PATENT DOCUMENTS 8,660,603 B2 * 2/2014 Block ...................... H04B 1/52 370/276
2014/0133364 A1 * 5/2014 Weissman ............ H04B 1/0057 370/273

* cited by examiner

*Primary Examiner* — Wayne Cai
(74) *Attorney, Agent, or Firm* — Withrow + Terranova, P.L.L.C.

(57) ABSTRACT

Radio frequency (RF) front end circuitry includes first RF multiplexer circuitry and second RF multiplexer circuitry. The first RF multiplexer circuitry is a quadplexer, while the second RF multiplexer is a triplexer. The RF front end circuitry is configured to support the transmission and reception of signals within a first operating band, a second operating band, and a third operating band. Further, the RF front end circuitry is configured to support carrier aggregation configurations between the first operating band and the third operating band and the second operating band and the third operating band.

20 Claims, 9 Drawing Sheets

| OPERATING BAND | UPLINK (UL) OPERATING BAND | DOWNLINK (DL) OPERATING BAND | DUPLEX MODE |
|---|---|---|---|
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | RESERVED | RESERVED | - |
| 16 | RESERVED | RESERVED | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

*FIG. 1*
*(RELATED ART)*

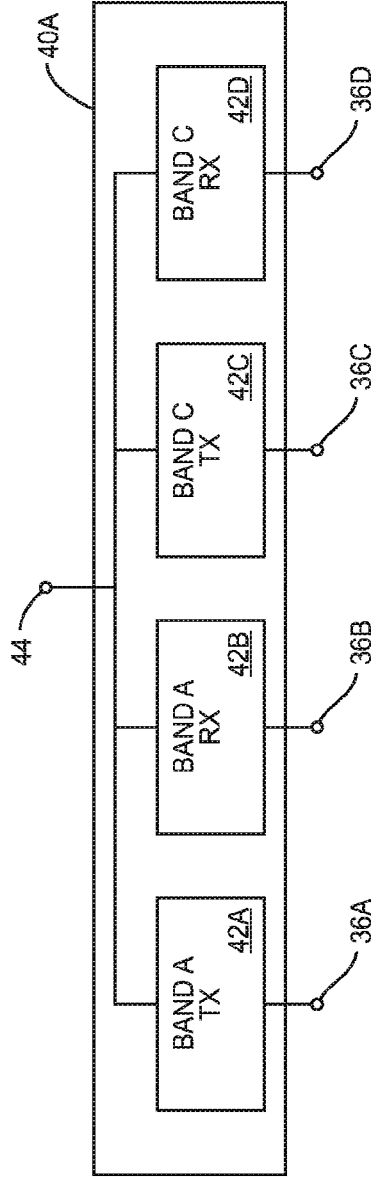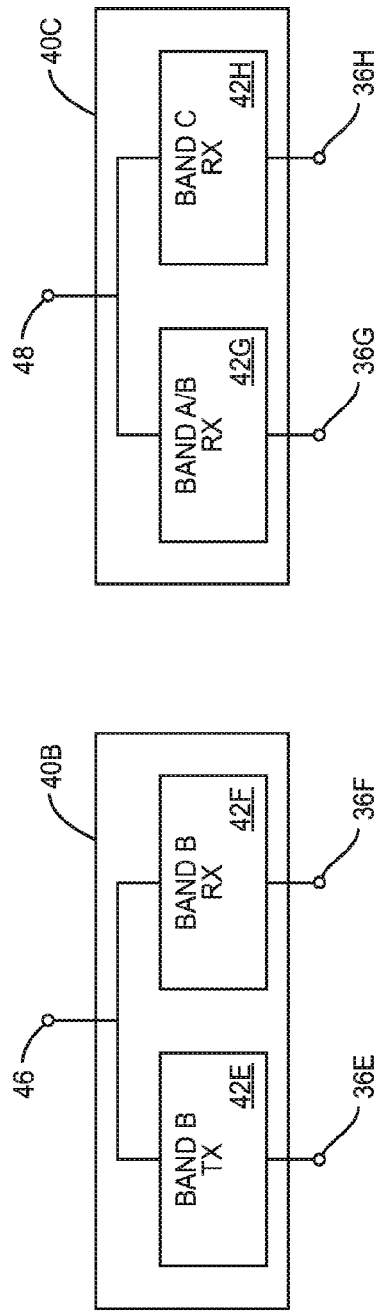

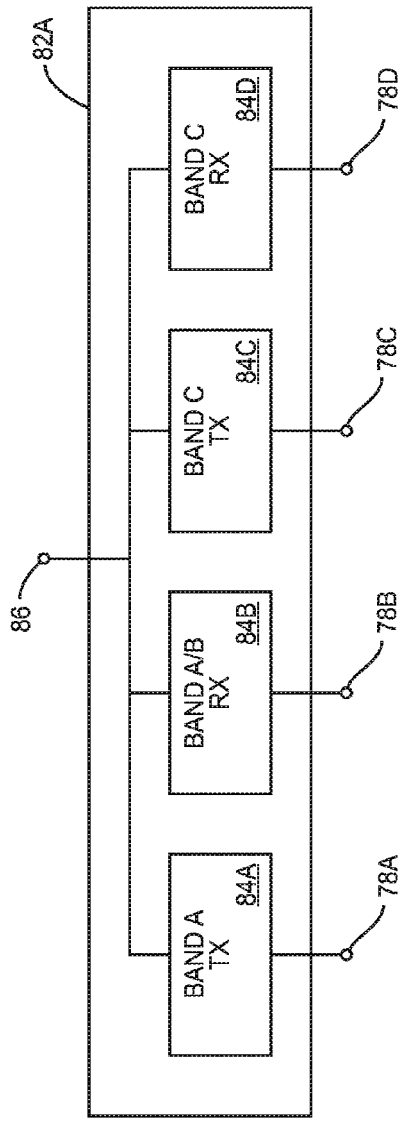
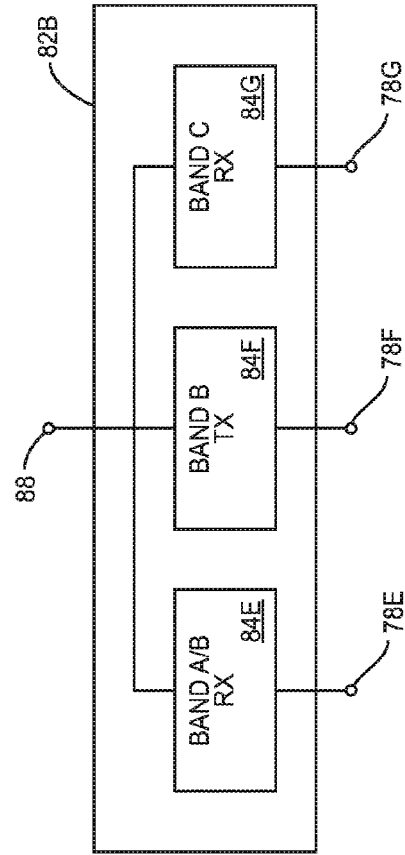
FIG. 8A
FIG. 8B

RADIO FREQUENCY FRONT END CIRCUITRY FOR CARRIER AGGREGATION

RELATED APPLICATIONS

This application claims the benefit of U.S. provisional patent application No. 62/113,763, filed Feb. 9, 2015, the disclosure of which is incorporated herein by reference in its entirety.

FIELD OF THE DISCLOSURE

The present disclosure relates to radio frequency (RF) front end circuitry, and specifically to RF front end circuitry configured to support one or more carrier aggregation configurations.

BACKGROUND

FIG. 1 shows a table describing a number of wireless communications operating bands in the wireless spectrum. One or more of the operating bands may be used, for example, in a Code Division Multiple Access (CDMA), Global System for Mobile Communications (GSM), Long Term Evolution (LTE), or LTE-advanced equipped wireless communications device. The first column indicates the operating band number for each one of the operating bands. The second and third columns indicate the uplink and downlink frequency bands for each one of the operating bands, respectively. Finally, the fourth column indicates the duplex mode of each one of the operating bands. In non-carrier aggregation configurations, a wireless communications device will generally communicate using a single portion of the uplink or downlink frequency bands within a single operating band. In carrier aggregation applications, however, a wireless communications device may aggregate bandwidth across a single operating band or multiple operating bands in order to increase the data rate of the device.

FIG. 2A shows a diagram representing a conventional, non-carrier aggregation configuration for a wireless communications device. In this conventional configuration, a wireless communications device communicates using a single portion of the wireless spectrum 10 within a single operating band 12. Under the conventional approach, the data rate of the wireless communications device is constrained by the limited available bandwidth.

FIGS. 2B-2D show diagrams representing a variety of carrier aggregation configurations for a wireless communications device. FIG. 2B shows an example of contiguous intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated portions of the wireless spectrum 22A and 22B are located in different operating bands 24 and 26. A modern wireless communications device should be capable of supporting each one of the previously described carrier aggregation configurations.

The various carrier aggregation configurations discussed above can be performed between two or more frequency division duplexing (FDD) bands, two or more time division duplexing (TDD) bands, or a combination thereof. Generally, a wireless communications device will aggregate bandwidth when receiving data (i.e., during downlink), but will use a single operating band when transmitting data (i.e., during uplink). However, carrier aggregation may also be used during data transfer to increase uplink throughput.

FIG. 3 shows a schematic representation of conventional radio frequency (RF) front end circuitry 28 configured to support at least one carrier aggregation configuration. The conventional RF front end circuitry 28 includes a first antenna 30A, a second antenna 30B, antenna switching circuitry 32 coupled to the first antenna 30A and the second antenna 30B, RF filtering circuitry 34 coupled between the antenna switching circuitry 32 and a number of input/output nodes 36 (shown individually as 36A through 36H), and transceiver circuitry 38 coupled to the input/output nodes 36. The RF filtering circuitry 34 includes first RF multiplexer circuitry 40A, second RF multiplexer circuitry 40B, and third RF multiplexer circuitry 40C. The first RF multiplexer circuitry 40A is a quadplexer, while the second RF multiplexer circuitry 40B and the third RF multiplexer circuitry 40C are duplexers. Details of the first RF multiplexer circuitry 40A, the second RF multiplexer circuitry 40B, and the third RF multiplexer circuitry 40C are shown in FIGS. 4A through 4C.

FIG. 4A shows a block diagram of the first RF multiplexer circuitry 40A. The first RF multiplexer circuitry 40A includes a first filter 42A coupled between a first common node 44 and a first one of the input/output nodes 36A, a second filter 42B coupled between the first common node 44 and a second one of the input/output nodes 36B, a third filter 42C coupled between the first common node 44 and a third one of the input/output nodes 36C, and a fourth filter 42D coupled between the first common node 44 and a fourth one of the input/output nodes 36D.

FIG. 4B shows a block diagram of the second RF multiplexer circuitry 40B. The second RF multiplexer circuitry 40B includes a fifth filter 42E coupled between a second common node 46 and a fifth one of the input/output nodes 36E and a sixth filter 42F coupled between the second common node 46 and a sixth one of the input/output nodes 36F.

FIG. 4C shows a block diagram of the third RF multiplexer circuitry 40C. The third RF multiplexer circuitry 40C includes a seventh filter 42G coupled between a third common node 48 and a seventh one of the input/output nodes 36G and an eighth filter 42H coupled between the third common node 48 and an eighth one of the input/output nodes 36H.

The RF filtering circuitry 34 is configured to selectively pass RF transmit signals and RF receive signals within a first operating band (band A), a second operating band (band B), and a third operating band (band C) between the antenna switching circuitry 32 and the transceiver circuitry 38. As discussed below, the RF filtering circuitry 34 facilitates at least one carrier aggregation configuration in the conventional RF front end circuitry 28.

A filter response of the first filter 42A includes a pass band configured to pass RF transmit signals within the first operating band (band A) provided at the first one of the input/output nodes 36A to the first common node 44 while attenuating other signals. A filter response of the second filter 42B includes a pass band configured to pass RF receive signals within the first operating band (band A) received at the first common node 44 to the second one of the input/output nodes 36B while attenuating other signals. A filter response of the third filter 42C includes a pass band configured to pass RF transmit signals within the third operating band (band C) between the third one of the input/output nodes 36C and the first common node 44, while attenuating other signals. A filter response of the fourth filter 42D includes a pass band configured to pass RF receive signals within the third operating band (band C) between the first common node 44 and the fourth one of the input/output nodes 36D, while attenuating other signals. A filter response of the fifth filter 42E includes a pass band configured to pass RF transmit signals within the second operating band (band B) between the fifth one of the input/output nodes 36E and the second common node 46, while attenuating other signals. A filter response of the sixth filter 42F includes a pass band configured to pass RF receive signals within the second operating band (band B) between the second common node 46 and the sixth one of the input/output nodes 36F, while attenuating other signals. A filter response of the seventh filter 42G includes a pass band configured to pass RF receive signals within the first operating band (band A) and RF receive signals within the second operating band (band B) between the third common node 48 and the seventh one of the input/output nodes 36F, while attenuating other signals. A filter response of the eighth filter 42H includes a pass band configured to pass RF receive signals within the third operating band (band C) between the third common node 48 and the eighth one of the input/output nodes 36G, while attenuating other signals.

The conventional RF front end circuitry 28 is capable of operating in a standard (i.e., non-carrier aggregation) mode in any one of the first operating band (band A), the second operating band (band B), and the third operating band (band C). To operate in a standard mode in the first operating band (band A), the antenna switching circuitry 32 couples the first RF multiplexer circuitry 40A to the first antenna 30A and the third RF multiplexer circuitry 40C to the second antenna 30B. The transceiver circuitry 38 provides an RF transmit signal within the first operating band (band A) to the first one of the input/output nodes 36A, where it is passed by the first filter 42A to the first common node 44, and, subsequently, to the first antenna 30A via the antenna switching circuitry 32. RF receive signals within the first operating band (band A) received at the first antenna 30A are passed to the first common node 44 via the antenna switching circuitry 32, where they are then passed by the second filter 42B to the second one of the input/output nodes 36B and processed by the transceiver circuitry 38. RF receive signals within the first operating band (band A) received at the second antenna 30B are passed to the third common node 48 via the antenna switching circuitry 32, where they are then passed by the seventh filter 42G to the seventh one of the input/output nodes 36F and processed by the transceiver circuitry 38. The RF receive signals provided to the third RF multiplexer circuitry 40C are generally used as multiple-input-multiple-output (MIMO) diversity receive signals to improve the quality of reception of the conventional RF front end circuitry 28. The antenna switching circuitry 32 may switch the first antenna 30A and the second antenna 30B as desired to improve transmit and/or receive reception from the conventional RF front end circuitry 28.

Without changing the connections made by the antenna switching circuitry 32, the conventional RF front end circuitry 28 may also operate in a standard mode in the third operating band (band C). In such an operating mode, the transceiver circuitry 38 provides an RF transmit signal within the third operating band (band C) to the third one of the input/output nodes 36C, where it is passed by the third filter 42C to the first common node 44, and, subsequently, to the first antenna 30A via the antenna switching circuitry 32. RF receive signals within the third operating band (band C) received at the first antenna 30A are passed to the first common node 44 via the antenna switching circuitry 32, where they are then passed by the fourth filter 42D to the fourth one of the input/output nodes 36D and processed by the transceiver circuitry 38. RF receive signals within the third operating band (band C) received at the second antenna 30B are passed to the third common node 48 via the antenna switching circuitry 32, where they are then passed by the eighth filter 42H to the eighth one of the input/output nodes 36H and processed by the transceiver circuitry 38. The RF receive signals provided to the third RF multiplexer circuitry 40C are generally used as MIMO diversity receive signals to improve the quality of reception of the conventional RF front end circuitry 28. The antenna switching circuitry 32 may switch the first antenna 30A and the second antenna 30B as desired to improve transmit and/or receive reception from the conventional RF front end circuitry 28.

To operate in a standard mode in the second operating band (band B), the antenna switching circuitry 32 couples the second RF multiplexer circuitry 40B to the first antenna 30A and the third RF multiplexer circuitry 40C to the second antenna 30B. The transceiver circuitry 38 provides an RF transmit signal within the second operating band (band B) to the fifth one of the input/output nodes 36E, where it is passed by the fifth filter 42E to the second common node 46, and, subsequently, to the first antenna 30A via the antenna switching circuitry 32. RF receive signals within the second operating band (band B) received at the first antenna 30A are passed to the second common node 46 via the antenna switching circuitry 32, where they are then passed by the sixth filter 42F to the sixth one of the input/output nodes 36F and processed by the transceiver circuitry 38. RF receive signals within the second operating band (band B) received at the second antenna 30B are passed to the third common node 48 via the antenna switching circuitry 32, where they are then passed by the seventh filter 42G to the seventh one of the input/output nodes 36G and processed by the transceiver circuitry 38. The RF receive signals provided to the third RF multiplexer circuitry 40C are generally used as MIMO diversity receive signals to improve the quality of reception of the conventional RF front end circuitry 28. The antenna switching circuitry 32 may switch the first antenna 30A and the second antenna 30B as desired to improve transmit and/or receive reception from the conventional RF front end circuitry 28.

To operate in a carrier aggregation mode of operation using the first operating band (band A) and the third operating band (band C), the antenna switching circuitry 32 couples the first RF multiplexer circuitry 40A to the first antenna 30A and the third RF multiplexer circuitry 40C to the second antenna 30B. The transceiver circuitry 38 then provides an RF transmit signal within one of the first operating band (band A) and the third operating band (band C) to either the first one of the input/output nodes 36A or the third one of the input/output nodes 36C, respectively. RF receive signals within the first operating band (band A) and the third operating band (band C) are passed to the first common node 44 via the antenna switching circuitry 32, where they are then respectively passed by the second filter 42B and the fourth filter 42D to the second one of the input/output nodes 36B and the third one of the input/output nodes 36C and processed by the transceiver circuitry 38. RF receive signals within the first operating band (band A) and the third operating band (band C) are passed to the third common node 48 via the antenna switching circuitry 32, where they are then respectively passed by the seventh filter 42G and the eighth filter 42H to the seventh one of the input/output nodes 36G and the eighth one of the input/output nodes 36H. Accordingly, the conventional RF front end circuitry can transmit a signal in the first operating band or the second operating band while simultaneously receiving signals within both operating bands. The RF receive signals provided to the third RF multiplexer circuitry 40C are generally used as MIMO diversity receive signals to improve the quality of reception of the conventional RF front end circuitry 28. The antenna switching circuitry 32 may switch the first antenna 30A and the second antenna 30B as desired to improve transmit and/or receive reception from the conventional RF front end circuitry 28.

While the conventional RF front end circuitry 28 can be used in carrier aggregation configurations between the first operating band (band A) and the third operating band (band C), the structure of the RF filtering circuitry 34 does not allow for the aggregation of bandwidth between the second operating band (band B) and the third operating band (band C). As discussed above, it is desirable for RF front end circuitry to support as many carrier aggregation configurations as possible for maximum flexibility. Further, the conventional RF front end circuitry 28 requires eight filters. In general, it is desirable to minimize the number of filters used to support these carrier aggregation configurations in order to minimize the space consumed by the RF front end circuitry and the complexity thereof.

In light of the above, there is a need for RF front end circuitry with support for additional carrier aggregation configurations and less filters.

SUMMARY

The present disclosure relates to radio frequency (RF) front end circuitry, and specifically to RF front end circuitry configured to support one or more carrier aggregation configurations. In one embodiment, RF front end circuitry includes first RF multiplexer circuitry and second RF multiplexer circuitry. The first RF multiplexer circuitry is coupled between a first common node and a first set of input/output nodes. The second RF multiplexer circuitry is coupled between a second common node and a second set of input/output nodes. A filter response of the first RF multiplexer circuitry includes a first pass band configured to pass RF transmit signals within a first operating band between a first one of the first set of input/output nodes and the first common node, a second pass band configured to pass RF receive signals within the first operating band and RF receive signals within the second operating band between the first common node and a second one of the first set of input/output nodes, a third pass band configured to pass RF transmit signals within a third operating band between a third one of the first set of input/output nodes and the first common node, and a fourth pass band configured to pass RF receive signals within the third operating band between the first common node and a fourth one of the first set of input/output nodes. Signals outside of the first pass band, the second pass band, the third pass band, and the fourth pass band are attenuated by the first RF multiplexer circuitry. A filter response of the second RF multiplexer circuitry includes a fifth pass band configured to pass RF receive signals within the first operating band and RF receive signals within the second operating band between the second common node and a first one of the second set of input/output nodes, a sixth pass band configured to pass RF transmit signals within the second operating band between a second one of the second set of input/output nodes and the second common node, and a seventh pass band configured to pass RF receive signals within the third operating band between the second common node and a third one of the second set of input/output nodes. Signals outside of the fifth pass band, the sixth pass band, and the seventh pass band are attenuated by the second RF multiplexer circuitry.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a table describing a number of operating bands for a wireless communications network.

FIGS. 4A through 4C are block diagrams of conventional RF multiplexers.

FIGS. 8A and 8B are block diagrams of RF multiplexers according to one embodiment of the present disclosure.

DETAILED DESCRIPTION

Figure 2A:
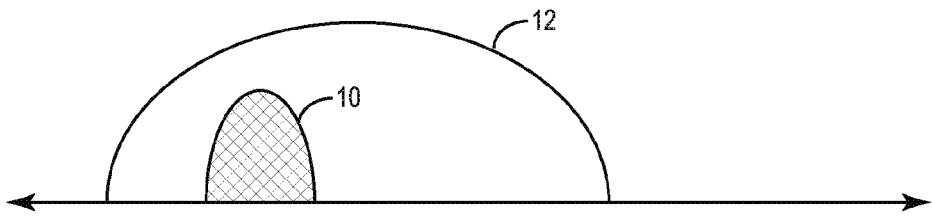
FIGS. 2A through 2D are diagrams illustrating a number of carrier aggregation configurations.
Figure 2B:
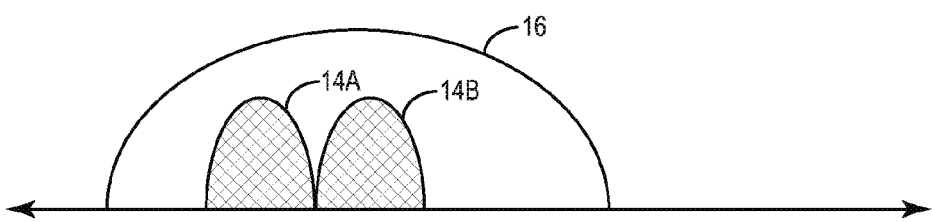
Figure 2C:
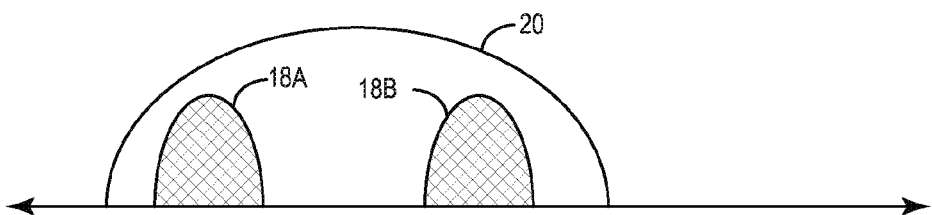
Figure 2D:
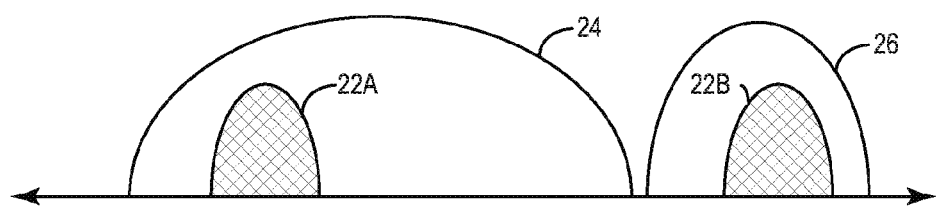
Figure 3:
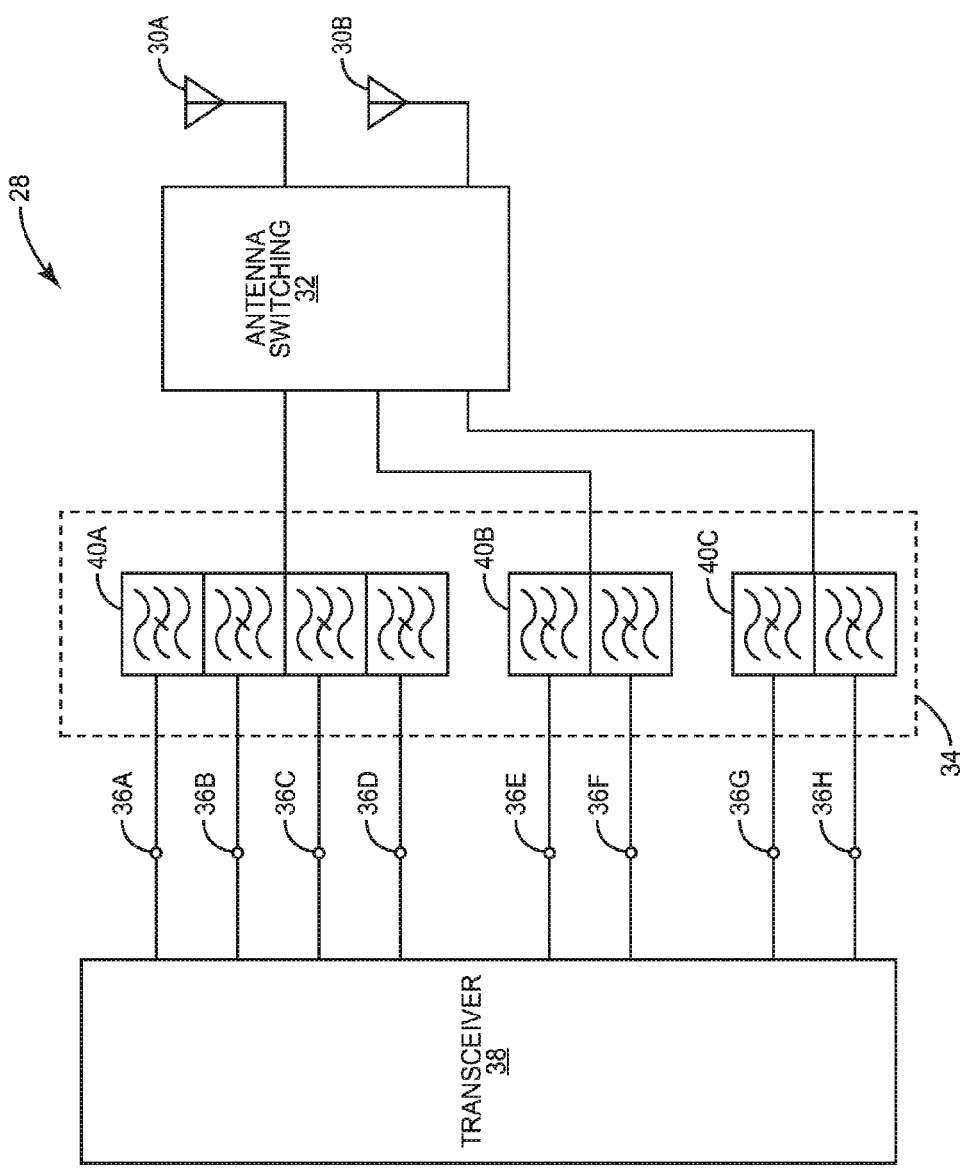
FIG. 3 is a functional schematic of conventional radio frequency (RF) front end circuitry.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Modern mobile telecommunications standards continue to demand increasingly greater rates of data exchange (data rates). One way to increase the data rate of a wireless communications device is through the use of carrier aggregation. Carrier aggregation allows a single wireless communications device to aggregate bandwidth across one or more operating bands in the wireless spectrum. The increased bandwidth achieved as a result of carrier aggregation allows a wireless communications device to obtain higher data rates than have previously been available.

Figure 5:
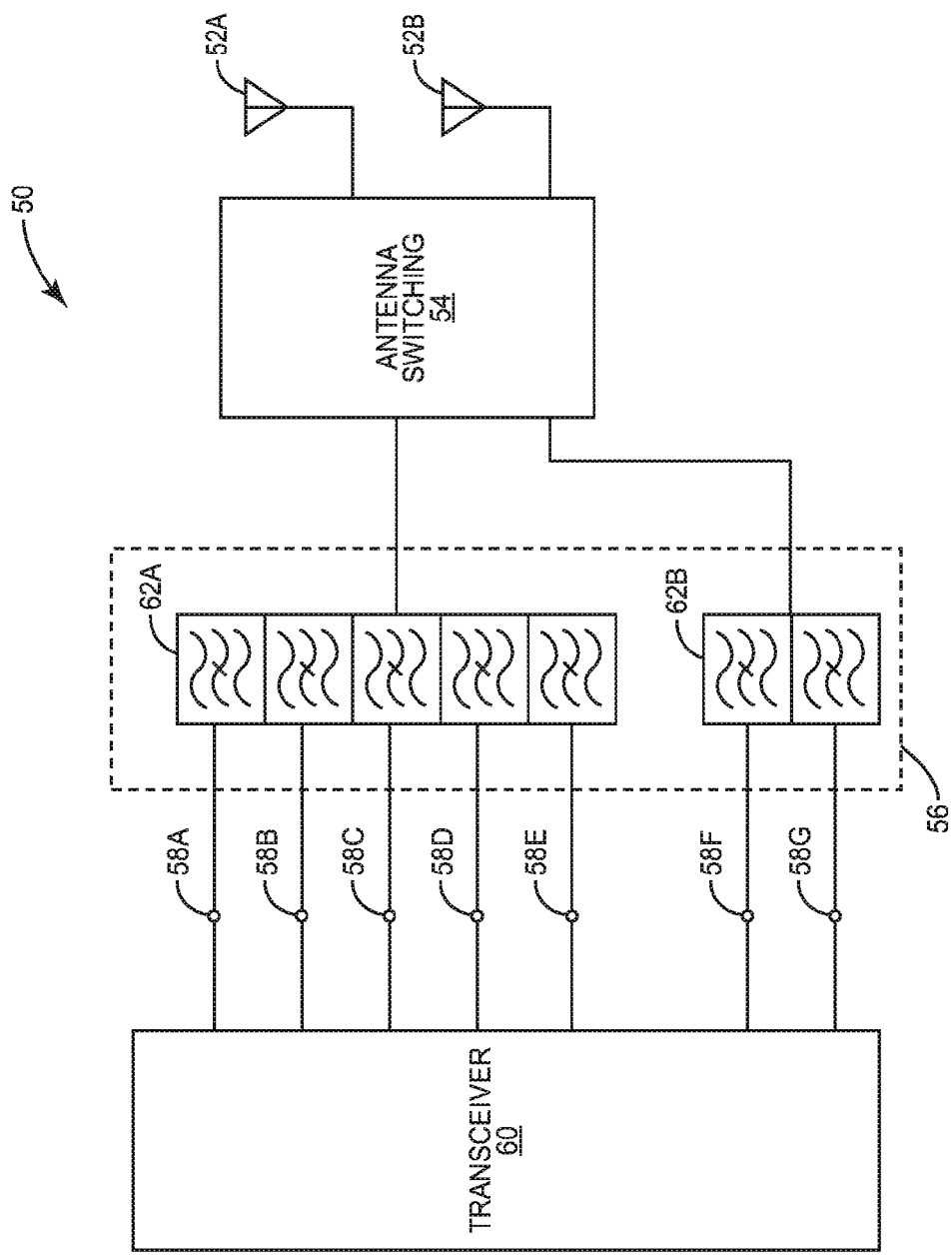
FIG. 5 is a functional schematic of RF front end circuitry according to one embodiment of the present disclosure.

FIG. 5 shows a schematic representation of radio frequency (RF) front end circuitry 50 according to one embodiment of the present disclosure. The RF front end circuitry 50 includes a first antenna 52A, a second antenna 52B, antenna switching circuitry 54 coupled to the first antenna 52A and the second antenna 52B, RF filtering circuitry 56 coupled between the antenna switching circuitry 54 and a number of input/output nodes 58 (shown individually as 58A through 58G), and transceiver circuitry 60 coupled to the input/output nodes 58. The RF filtering circuitry 56 includes first RF multiplexer circuitry 62A and second RF multiplexer circuitry 62B. The first RF multiplexer circuitry 62A is a quintplexer, while the second RF multiplexer circuitry 62B is a diplexer. Details of the first RF multiplexer circuitry 62A and the second RF multiplexer circuitry 62B are shown in FIGS. 6A and 6B, respectively.

Figure 6A:
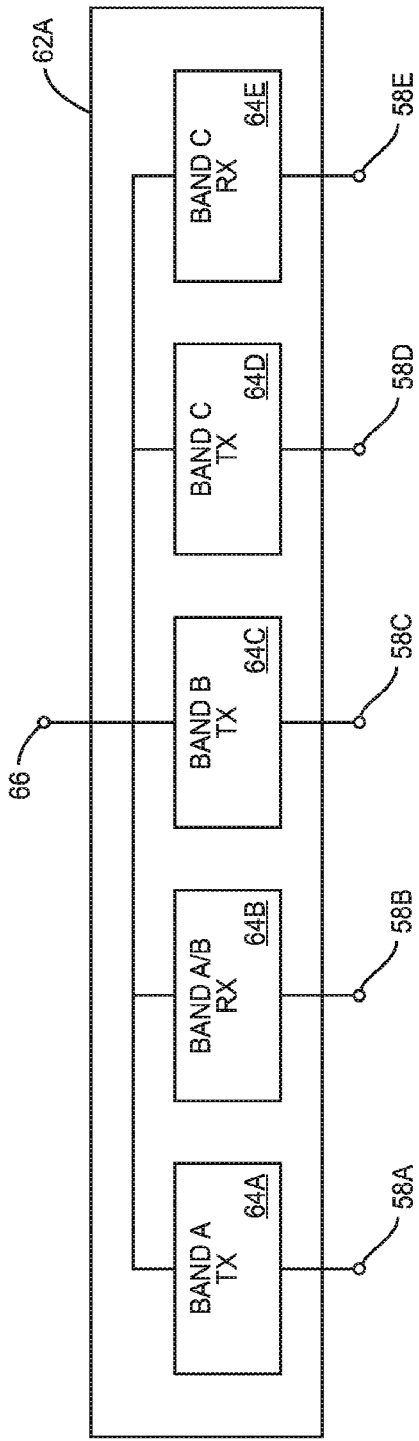
FIGS. 6A and 6B are block diagrams of RF multiplexer circuitry according to one embodiment of the present disclosure.

FIG. 6A shows a block diagram of the first RF multiplexer circuitry 62A according to one embodiment of the present disclosure. The first RF multiplexer circuitry 62A includes a first filter 64A coupled between a first common node 66 and a first one of the input/output nodes 58A, a second filter 64B coupled between the first common node 66 and a second one of the input/output nodes 58B, a third filter 64C coupled between the first common node 66 and a third one of the input/output nodes 58C, a fourth filter 64D coupled between the first common node 66 and a fourth one of the input/output nodes 58D, and a fifth filter 64E coupled between the first common node 66 and a fifth one of the input/output nodes 58E.

Figure 6B:
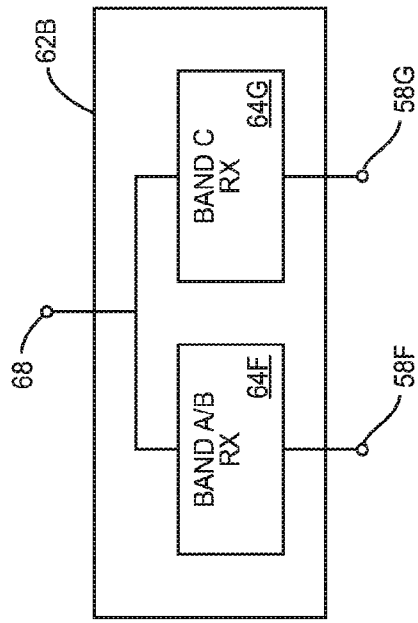

FIG. 6B shows a block diagram of the second RF multiplexer circuitry 62B according to one embodiment of the present disclosure. The second RF multiplexer circuitry 62B includes a sixth filter 64F coupled between a second common node 68 and a sixth one of the input/output nodes 58F and a seventh filter 64G coupled between the second common node 68 and a seventh one of the input/output nodes 58G.

The RF filtering circuitry 56 is configured to selectively pass RF transmit signals and RF receive signals within a first operating band (band A), a second operating band (band B), and a third operating band (band C) between the antenna switching circuitry 54 and the transceiver circuitry 60. As discussed below, the RF filtering circuitry 56 facilitates at least two carrier aggregation configurations in the RF front end circuitry 50.

A filter response of the first filter 64A includes a pass band configured to pass RF transmit signals within the first operating band (band A) provided at the first one of the input/output nodes 58A to the first common node 66 while attenuating other signals. A filter response of the second filter 64B includes a pass band configured to pass RF receive signals within the first operating band (band A) and RF receive signals within the second operating band (band B) received at the first common node 66 to the second one of the input/output nodes 58B while attenuating other signals. A filter response of the third filter 64C includes a pass band configured to pass RF transmit signals within the second operating band (band B) between the third one of the input/output nodes 58C and the first common node 66 while attenuating other signals. A filter response of the fourth filter 64D includes a pass band configured to pass RF transmit signals within the third operating band (band C) between the fourth one of the input/output nodes 58D and the first common node 66 while attenuating other signals. A filter response of the fifth filter 64E includes a pass band configured to pass RF receive signals within the third operating band between the first common node 66 and the fifth one of the input/output nodes 58E while attenuating other signals. A filter response of the sixth filter 64F includes a pass band configured to pass RF receive signals within the first operating band (band A) and RF receive signals within the second operating band (band B) between the second common node 68 and the sixth one of the input/output nodes 58F. A filter response of the seventh filter 64G includes a pass band configured to pass RF receive signals within the third operating band (band C) between the second common node 68 and the seventh one of the input/output nodes 58G while attenuating other signals.

The RF front end circuitry 50 is capable of operating in a standard (i.e., non-carrier aggregation) mode in any one of the first operating band (band A), the second operating band (band B), and the third operating band (band C). To operate in a standard mode in the first operating band (band A), the antenna switching circuitry 54 couples the first RF multiplexer circuitry 62A to the first antenna 52A and couples the second RF multiplexer circuitry 62B to the second antenna 52B. The transceiver circuitry 60 provides an RF transmit signal within the first operating band (band A) to the first one of the input/output nodes 58A, where it is passed by the first filter 64A to the first common node 66, and, subsequently, to the first antenna 52A via the antenna switching circuitry 54. RF receive signals within the first operating band (band A) received at the first antenna 52A are passed to the first common node 66, where they are then passed by the second filter 64B to the second one of the input/output nodes 58B and processed by the transceiver circuitry 60. RF receive signals within the first operating band (band A) received at the second antenna 52B are passed to the second common node 68, where they are then passed by the sixth filter 64F to the sixth one of the input/output nodes 58F and processed by the transceiver circuitry 60. The RF receive signals provided to the second RF multiplexer circuitry 62B are generally used as multiple-input-multiple-output (MIMO) diversity receive signals to improve the quality of reception of the RF front end circuitry 50. The antenna switching circuitry 54 may switch the first antenna 52A and the second antenna 52B as desired to improve transmit and/or receive reception from the RF front end circuitry 50.

Without changing the connections made by the antenna switching circuitry 54, the RF front end circuitry 50 may also operate in a standard mode in the second operating band (band B). In such an operating mode, the transceiver circuitry 60 provides an RF transmit signal within the second operating band (band B) to the third one of the input/output nodes 58C, where it is passed by the third filter 64C to the first common node 66, and, subsequently, to the first antenna 52A via the antenna switching circuitry 54. RF receive signals within the second operating band (band B) received at the first antenna 52A are passed to the first common node 66 via the antenna switching circuitry 54, where they are then passed by the second filter 64B to the second one of the input/output nodes 58B and processed by the transceiver circuitry 60. RF receive signals within the second operating band (band B) received at the second antenna 52B are passed to the second common node 68 via the antenna switching circuitry 54, where they are then passed by the sixth filter 64F to the sixth one of the input/output nodes 58F and processed by the transceiver circuitry. The RF receive signals provided to the second RF multiplexer circuitry 62B are generally used as MIMO diversity receive signals to improve the quality of reception of the RF front end circuitry 50. The antenna switching circuitry 54 may switch the first antenna 52A and the second antenna 52B as desired to improve transmit and/or receive reception from the RF front end circuitry 50.

Once again, without changing the connections made by the antenna switching circuitry 54, the RF front end circuitry 50 may also operate in a standard mode in the third operating band (band C). In such an operating mode, the transceiver circuitry 60 provides an RF transmit signal within the third operating band (band C) to the fourth one of the input/output nodes 58D, where it is passed by the fourth filter 64D to the first common node 66, and, subsequently, to the first antenna 52A via the antenna switching circuitry 54. RF receive signals within the third operating band (band C) received at the first antenna 52A are passed to the first common node 66 via the antenna switching circuitry 54, where they are then passed by the fifth filter 64E to the fifth one of the input/output nodes 58E and processed by the transceiver circuitry 60. RF receive signals within the third operating band (band C) received at the second antenna 52B are passed to the second common node 68 via the antenna switching circuitry 54, where they are then passed by the seventh filter 64G to the seventh one of the input/output nodes 58G and processed by the transceiver circuitry. The RF receive signals provided to the second RF multiplexer circuitry 62B are generally used as MIMO diversity receive signals to improve the quality of reception of the RF front end circuitry 50. The antenna switching circuitry 54 may switch the first antenna 52A and the second antenna 52B as desired to improve transmit and/or receive reception from the RF front end circuitry 50.

To operate in a first carrier aggregation mode in which bandwidth is aggregated between the first operating band (band A) and the third operating band (band C), the antenna switching circuitry 54 couples the first RF multiplexer circuitry 62A to the first antenna 52A and couples the second RF multiplexer circuitry 62B to the second antenna 52B. The transceiver circuitry 60 then provides an RF transmit signal within one of the first operating band (band A) and the third operating band (band C) to either the first one of the input/output nodes 58A or the fourth one of the input/output nodes 58D, respectively, where the RF transmit signal is passed by either the first filter 64A or the third filter 64C to the first common node 66, and, subsequently, to the first antenna 52A via the antenna switching circuitry 54. RF receive signals within the first operating band (band A) and the third operating band (band C) received at the first antenna 52A are passed to the first common node 66 via the antenna switching circuitry 54, where they are then respectively passed by the second filter 64B and the fifth filter 64E to the second one of the input/output nodes 58B and the fifth one of the input/output nodes 58E and processed by the transceiver circuitry 60. RF receive signals within the first operating band (band A) and the third operating band (band C) received at the second antenna 52B are passed to the second common node 68 via the antenna switching circuitry 54, where they are then respectively passed by the sixth filter 64F and the seventh filter 64G to the sixth one of the input/output nodes 58F and the seventh one of the input/output nodes 58G and processed by the transceiver circuitry 60. The RF receive signals provided to the second RF multiplexer circuitry 62B are generally used as MIMO diversity receive signals to improve the quality of reception of the RF front end circuitry 50. The antenna switching circuitry 54 may switch the first antenna 52A and the second antenna 52B as desired to improve transmit and/or receive reception from the RF front end circuitry 50.

To operate in a second carrier aggregation configuration in which bandwidth is aggregated between the second operating band (band B) and the third operating band (band C), the antenna switching circuitry 54 couples the first RF multiplexer circuitry 62A to the first antenna 52 and couples the second RF multiplexer circuitry 62B to the second antenna 52B. The transceiver circuitry 60 then provides an RF transmit signal within the second operating band (band B) or the third operating band (band C) to the third one of the input/output nodes 58C or the fourth one of the input/output nodes 58D, respectively, where the RF transmit signal is passed by the third filter 64C or the fourth filter 64D to the first common node 66, and, subsequently to the first antenna 52A via the antenna switching circuitry 54. RF receive signals within the second operating band (band B) and the third operating band (band C) received at the first antenna 52A are passed to the first common node 66 via the antenna switching circuitry 54, where they are then respectively passed by the second filter 64B and the fifth filter 64E to the second one of the input/output nodes 58B and the fifth one of the input/output nodes 58E and processed by the transceiver circuitry 60. RF receive signals within the second operating band (band B) and the third operating band (band C) received at the second antenna 52B are passed to the second common node 68 via the antenna switching circuitry 54, where they are then respectively passed by the sixth filter 64F and the seventh filter 64G to the sixth one of the input/output nodes 58F and the seventh one of the input/output nodes 58G and processed by the transceiver circuitry 60. The RF receive signals provided to the second RF multiplexer circuitry 62B are generally used as MIMO diversity receive signals to improve the quality of reception of the RF front end circuitry 50. The antenna switching circuitry 54 may switch the first antenna 52A and the second antenna 52B as desired to improve transmit and/or receive reception from the RF front end circuitry 50.

The RF front end circuitry 50 is thus able to support carrier aggregation configurations between the first operating band (band A) and the third operating band (band C), and the second operating band (band B) and the third operating band (band C) using only seven filters. In one embodiment, the first operating band (band A) is long term evolution (LTE) band 12, the second operating band (band B) is LTE band 13, and the third operating band (band C) is one of band 5 and band 26. The respective transmit and receive sub-bands for each operating band are shown in FIG. 1. As shown in FIG. 1, the receive sub-bands for LTE band 12 and LTE band 13 are adjacent to one another, such that combining the receive filters for each only requires extending the pass band of a filter for LTE band 12 by 10 MHz. Third generation partnership project (3GPP) standards require out-of-band blocking for each operating band to be −44 dB between 15 MHz and 60 MHz on either side of a receiver band. Most transceiver circuitry can handle blocker signals at these levels. Accordingly, using a single filter for RF receive signals within LTE band 12 and LTE band 13 does not cause problems in the RF front end circuitry 50. Other combinations of operating bands with similar characteristics may also be used without departing from the principles of the present disclosure.

Each one of the first filter 64A, the second filter 64B, the third filter 64C, the fourth filter 64D, the fifth filter 64E, the sixth filter 64F, and the seventh filter 64G may be one of a surface acoustic wave (SAW) filter, a bulk acoustic wave (BAW) filter, and a lumped LC filter. Further, any number of the first filter 64A, the second filter 64B, the third filter 64C, the fourth filter 64D, the fifth filter 64E, the sixth filter 64F, and the seventh filter 64G may be combined into a single filter or provided on a single filter substrate without departing from the principles described herein.

While the RF front end circuitry 50 described with respect to FIGS. 5 and 6 is capable of supporting carrier aggregation configurations between the first operating band (band A) and the third operating band (band C) and the second operating band (band B) and the third operating band (band C), the RF front end circuitry 50 uses a quintplexer for the first RF multiplexer circuitry 62A, which may degrade the performance of the RF front end circuitry 50. As will be appreciated by those skilled in the art, the larger the number of filters coupled to a common node, the higher the loading associated with the RF multiplexer circuitry, and thus the worse the performance.

Figure 7:
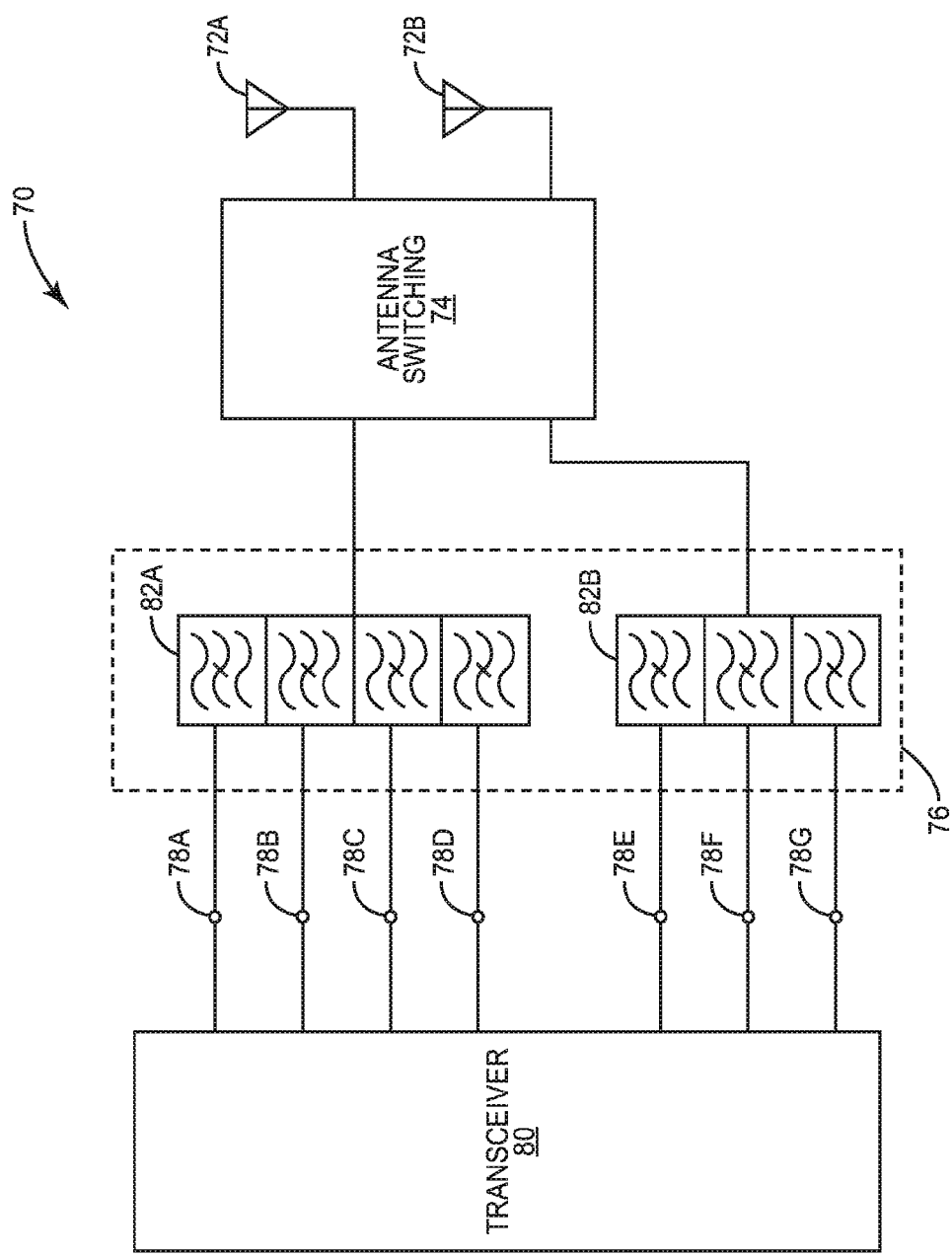
FIG. 7 is a functional schematic of RF front end circuitry according to one embodiment of the present disclosure.

Accordingly, FIG. 7 shows RF front end circuitry 70 according to an additional embodiment of the present disclosure. The RF front end circuitry 70 includes a first antenna 72A, a second antenna 72B, antenna switching circuitry 74 coupled to the first antenna 72A and the second antenna 72B, RF filtering circuitry 76 coupled between the antenna switching circuitry 74 and a number of input/output nodes 78 (shown individually as 78A through 78G), and transceiver circuitry 80 coupled to the input/output nodes 78. The RF filtering circuitry 76 includes first RF multiplexer circuitry 82A and second RF multiplexer circuitry 82B. The first RF multiplexer circuitry 82A is a quadplexer, while the second RF multiplexer circuitry 82B is a triplexer. Details of the first RF multiplexer circuitry 82A and the second RF multiplexer circuitry 82B are shown in FIGS. 8A and 8B, respectively.

FIG. 8A shows a block diagram of the first RF multiplexer circuitry 82A according to one embodiment of the present disclosure. The first RF multiplexer circuitry 82A includes a first filter 84A coupled between a first common node 86 and a first one of the input/output nodes 78A, a second filter 84B coupled between the first common node 86 and a second one of the input/output nodes 78B, a third filter 84C coupled between the first common node 86 and a third one of the input/output nodes 78C, and a fourth filter 84D coupled between the first common node 86 and a fourth one of the input/output nodes 78D.

FIG. 8B shows a block diagram of the second RF multiplexer circuitry 82B according to one embodiment of the present disclosure. The second RF multiplexer circuitry 82B includes a fifth filter 84E coupled between a second common node 88 and a fifth one of the input/output nodes 78E, a sixth filter 84F coupled between the second common node 88 and a sixth one of the input/output nodes 78F, and a seventh filter 84G coupled between the second common node 88 and a seventh one of the input/output nodes 78G.

A filter response of the first filter 84A includes a pass band configured to pass transmit signals within the first operating band (band A) provided at the first one of the input/output nodes 78A to the first common node 86 while attenuating other signals. A filter response of the second filter 84B includes a pass band configured to pass RF receive signals within the first operating band (band A) and RF receive signals within the second operating band (band B) received at the first common node 86 to the second one of the input/output nodes 78B while attenuating other signals. A filter response of the third filter 84C includes a pass band configured to pass RF transmit signals within the third operating band (band C) between the third one of the input/output nodes 78C and the first common node 86 while attenuating other signals. A filter response of the fourth filter 84D includes a pass band configured to pass RF receive signals within the third operating band (band C) between the first common node 86 and the fourth one of the input/output nodes 78D while attenuating other signals. A filter response of the fifth filter 84E includes a pass band configured to pass RF receive signals within the first operating band (band A) and RF receive signals within the second operating band (band B) between the second common node 88 and the fifth one of the input/output nodes 78E while attenuating other signals. A filter response of the sixth filter 84F includes a pass band configured to pass RF transmit signals within the second operating band (band B) between the sixth one of the input/output nodes 78F and the second common node 88 while attenuating other signals. A filter response of the seventh filter 84G includes a pass band configured to pass RF receive signals within the third operating band (band C) between the second common node 88 and the seventh one of the input/output nodes 78G while attenuating other signals.

The RF front end circuitry 70 is capable of operating in a standard (i.e., non-carrier aggregation) mode in any one of the first operating band (band A), the second operating band (band B), and the third operating band (band C). To operate in a standard mode in the first operating band (band A), the antenna switching circuitry 74 couples the first RF multiplexer circuitry 82A to the first antenna 72A and the second RF multiplexer circuitry 82B to the second antenna 72B. The transceiver circuitry 80 provides an RF transmit signal within the first operating band (band A) to the first one of the input/output nodes 78A, where it is passed by the first filter 84A to the first common node 86, and, subsequently, to the first antenna 72A via the antenna switching circuitry 74. RF receive signals within the first operating band (band A) received at the first antenna 72A are passed to the first common node 86 via the antenna switching circuitry 74, where they are then passed by the second filter 84B to the second one of the input/output nodes 78B and processed by the transceiver circuitry 80. RF receive signals within the first operating band (band A) received at the second antenna 72B are passed to the second common node 88 via the antenna switching circuitry 74, where they are then passed by the fifth filter 84E to the fifth one of the input/output nodes 78E and processed by the transceiver circuitry 80. The RF receive signals provided to the second RF multiplexer circuitry 82B are generally used as MIMO diversity receive signals in order to improve the quality of reception of the RF front end circuitry 70. The antenna switching circuitry 74 may switch the first antenna 72A and the second antenna 72B as desired to improve transmit and/or receive reception from the RF front end circuitry 70.

Without changing the connections made by the RF front end circuitry 70, the RF front end circuitry 70 may also operate in a standard mode in the second operating band (band B). In such an operating mode, the transceiver circuitry 80 provides an RF transmit signal within the second operating band (band B) to the sixth one of the input/output nodes 78F, where it is passed by the sixth filter 84F to the second common node 88, and, subsequently to the second antenna 72B via the antenna switching circuitry 74. RF receive signals within the second operating band (band B) received at the first antenna 72A are provided to the first common node 86 via the antenna switching circuitry 74, where they are then passed by the second filter 84B to the second one of the input/output nodes 78B and processed by the transceiver circuitry 80. RF receive signals within the second operating band (band B) received at the second antenna 72B are provided to the second common node 88 via the antenna switching circuitry 74, where they are then passed by the fifth filter 84E to the fifth one of the input/output nodes 78E and processed by the transceiver circuitry 80. The RF receive signals provided to the first RF multiplexer circuitry 82A are generally used as MIMO diversity receive signals in order to improve the quality of reception of the RF front end circuitry 70. The antenna switching circuitry 74 may switch the first antenna 72A and the second antenna 72B as desired to improve transmit and/or receive reception from the RF front end circuitry 70.

Once again, without changing the connections made by the antenna switching circuitry 74, the RF front end circuitry 70 may also operate in a standard mode in the third operating band (band C). In such an operating mode, the transceiver circuitry 80 provides an RF transmit signal within the third operating band (band C) to the third one of the input/output nodes 78C, where it is passed by the third filter 84C to the first common node 86, and, subsequently to the first antenna 72A via the antenna switching circuitry 74. RF receive signals within the third operating band (band C) received at the first antenna 72A are provided to the first common node 86 via the antenna switching circuitry 74, where they are then passed by the fourth filter 84D to the fourth one of the input/output nodes 78D and processed by the transceiver circuitry 80. RF receive signals within the third operating band (band C) received at the second antenna 72B are provided to the second common node 88 via the antenna switching circuitry 74, where they are then passed by the seventh filter 84G to the seventh one of the input/output nodes 78G and processed by the transceiver circuitry 80. The RF receive signals provided to the second RF multiplexer circuitry 82B are generally used as MIMO diversity receive signals in order to improve the quality of reception of the RF front end circuitry 70. The antenna switching circuitry 74 may switch the first antenna 72A and the second antenna 72B as desired to improve transmit and/or receive reception from the RF front end circuitry 70.

To operate in a first carrier aggregation mode in which bandwidth is aggregated between the first operating band (band A) and the third operating band (band C), the antenna switching circuitry 74 couples the first RF multiplexer circuitry 82A to the first antenna 72A and the second RF multiplexer circuitry 82B to the second antenna 72B. The transceiver circuitry 80 then provides an RF transmit signal within one of the first operating band (band A) and the third operating band (band C) to either the first one of the input/output nodes 78A or the third one of the input/output nodes 78C, respectively, where the RF transmit signal is passed by the first filter 84A or the third filter 84C to the first common node 86, and, subsequently to the first antenna 72A via the antenna switching circuitry 74. RF receive signals within the first operating band (band A) and the third operating band (band C) received at the first antenna 72A are provided to the first common node 86 via the antenna switching circuitry 74, where they are then respectively passed by the second filter 84B and the fourth filter 84D to the second one of the input/output nodes 78B and the fourth one of the input/output nodes 78D and processed by the transceiver circuitry 80. RF receive signals within the first operating band (band A) and the third operating band (band C) received at the second antenna 72B are provided to the second common node 88 via the antenna switching circuitry 74, where they are then respectively passed by the fifth filter 84E and the seventh filter 84G to the fifth one of the input/output nodes 78E and the seventh one of the input/output nodes 78G and processed by the transceiver circuitry 80. The RF receive signals provided to the second RF multiplexer circuitry 82B are generally used as MIMO diversity receive signals in order to improve the quality of reception of the RF front end circuitry 70. The antenna switching circuitry 74 may switch the first antenna 72A and the second antenna 72B as desired to improve transmit and/or receive reception from the RF front end circuitry 70.

To operate in a second carrier aggregation configuration in which bandwidth is aggregated between the second operating band (band B) and the third operating band (band C), the antenna switching circuitry 74 couples the first RF multiplexer circuitry 82A to the first antenna 72A and the second RF multiplexer circuitry 82B to the second antenna 72B. The transceiver circuitry 80 then provides an RF transmit signal within the second operating band (band B) or the third operating band (band C) to either the sixth one of the input/output nodes 78F or the third one of the input/output nodes 78C, respectively. If the RF transmit signal is within the second operating band (band B), the RF transmit signal is passed by the sixth filter 84F to the second common node 88, where it is then delivered to the second antenna 72B via the antenna switching circuitry 74. If the RF transmit signal is within the third operating band (band C), the RF transmit signal is passed by the third filter 84C to the first common node 86, where it is then delivered to the first antenna 72A via the antenna switching circuitry 74. RF receive signals within the second operating band (band B) and the third operating band (band C) received at the first antenna 72A are provided to the first common node 86 via the antenna switching circuitry 74, where they are then respectively passed by the second filter 84B and the fourth filter 84D to the second one of the input/output nodes 78B and the fourth one of the input/output nodes 78D and processed by the transceiver circuitry 80. RF receive signals within the second operating band (band B) and the third operating band (band C) received at the second antenna 72B are provided to the second common node 88 via the antenna switching circuitry 74, where they are then respectively passed by the fifth filter 84E and the seventh filter 84G to the fifth one of the input/output nodes 78E and the seventh one of the input/output nodes 78G and processed by the transceiver circuitry 80. If the RF transmit signal is within the second operating band (band B), signals provided to the first RF multiplexer circuitry 82A are generally used as MIMO diversity receive signals to improve the quality of reception of the RF front end circuitry 70. If the RF transmit signal is within the third operating band (band C), signals provided to the second RF multiplexer circuitry 82B are generally used as MIMO diversity receive signals to improve the quality of reception of the RF front end circuitry 70. The antenna switching circuitry 74 may switch the first antenna 72A and the second antenna 72B as desired to improve transmit and/or receive reception from the RF front end circuitry 70.

The RF front end circuitry 70 is thus able to support carrier aggregation configurations between the first operating band (band A) and the third operating band (band C), and the second operating band (band B) and the third operating band (band C) using only seven filters. Due to the fact that the order of the first RF multiplexer circuitry 82A is decreased, the RF front end circuitry 70 shown in FIG. 7 may perform better than that shown in FIG. 5. In one embodiment, the first operating band (band A) is long term evolution (LTE) band 12, the second operating band (band B) is LTE band 13, and the third operating band (band C) is one of band 5 and band 26. The respective transmit and receive sub-bands for each operating band are shown in FIG. 1. As shown in FIG. 1, the receive sub-bands for LTE band 12 and LTE band 13 are adjacent to one another, such that combining the receive filters for each only requires extending the pass band of a filter for LTE band 12 by 10 MHz. Third generation partnership project (3GPP) standards require out-of-band blocking for each operating band to be −44 dB between 15 MHz and 60 MHz on either side of a receiver band. Most transceiver circuitry can handle blocker signals at these levels. Accordingly, using a single filter for RF receive signals within LTE band 12 and LTE band 13 does not cause problems in the RF front end circuitry 70. Other combinations of operating bands with similar characteristics may also be used without departing from the principles of the present disclosure.

Each one of the first filter 84A, the second filter 84B, the third filter 84C, the fourth filter 84D, the fifth filter 84E, the sixth filter 84F, and the seventh filter 84G may be one of a SAW filter, a BAW filter, and a lumped LC filter, further any number of the first filter 84A, the second filter 84B, the third filter 84C, the fourth filter 84D, the fifth filter 84E, the sixth filter 84F, and the seventh filter 84G may be combined into a single filter or provided on a single filter substrate without departing from the principles described herein.

Figure 9:
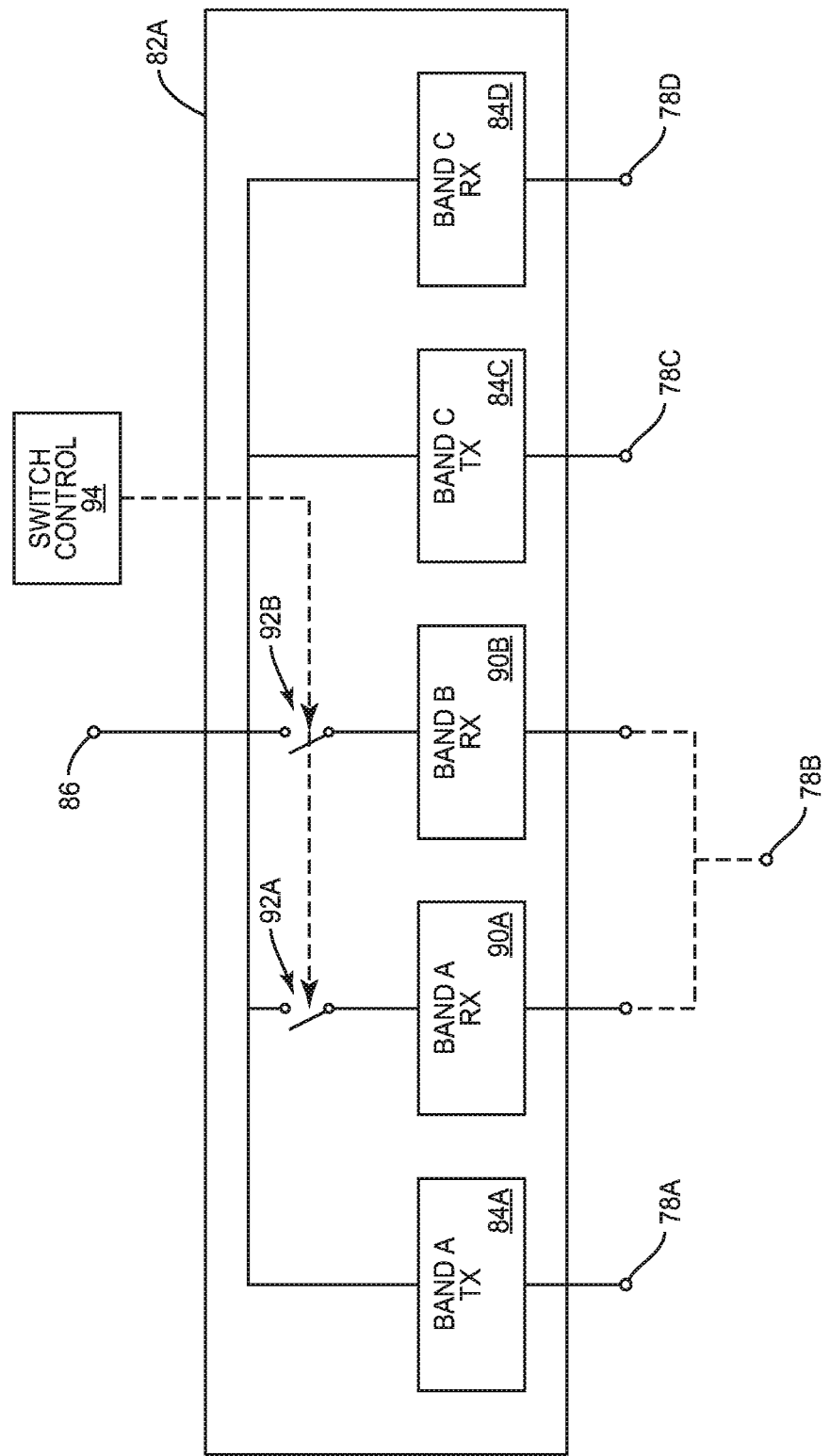
FIG. 9 is a block diagram of an RF multiplexer according to one embodiment of the present disclosure.

FIG. 9 shows details of the first RF multiplexer circuitry 82A according to an additional embodiment of the present disclosure. The first RF multiplexer circuitry 82A shown in FIG. 9 is substantially similar to that shown above in FIG. 8A, except that the second filter 84B is separated into a first sub-filter 90A and a second sub-filter 90B. The first sub-filter 90A is coupled to the first common node 86 via a first switch 92A. The second sub-filter 90B is coupled to the first common node 86 via a second switch 92B. Switch control circuitry 94 may be provided and coupled to the first switch 92A and the second switch 92B in order to control the state thereof. The first sub-filter 90A and the second sub-filter 90B may be coupled together at the second one of the input/output nodes 78B, or may be coupled to different input/output nodes 78. A filter response of the first sub-filter 90A includes a pass band configured to pass RF receive signals within the first operating band (band A) between the first common node 86 and the second one of the input/output nodes 78B while attenuating other signals. The second sub-filter 90B includes a pass band configured to pass RF receive signals within the second operating band (band B) between the first common node 86 and the second one of the input/output nodes 78B (or a separate input/output node) while attenuating other signals. In general, the switch control circuitry 94 is configured to close the first switch 92A and open the second switch 92B when the RF front end circuitry 70 is configured to receive signals within the first operating band (band A). Further, the switch control circuitry 94 is configured to open the first switch 92A and close the second switch 92B when the RF front end circuitry 70 is configured to receive signals within the second operating band (band B). Accordingly, signals within both bands may be separated by the first RF multiplexer circuitry 82A while avoiding the loading associated with five filters coupled to the first common node 86. This may improve the performance of the first RF multiplexer circuitry 82A in some scenarios.

Those skilled in the art will recognize improvements and modifications to the embodiments of the present disclosure. All such improvements and modifications are considered within the scope of the concepts disclosed herein and the claims that follow.

What is claimed is:
1. Radio frequency (RF) front end circuitry comprising:
   first radio frequency (RF) multiplexer circuitry coupled between a first common node and a first plurality of input/output nodes, wherein a filter response of the first RF multiplexer circuitry includes:
      a first pass band configured to pass RF transmit signals within a first operating band between a first one of the first plurality of input/output nodes and the first common node;
      a second pass band configured to pass RF receive signals within the first operating band and RF receive signals within a second operating band between the first common node and a second one of the first plurality of input/output nodes;
      a third pass band configured to pass RF transmit signals within a third operating band between a third one of the first plurality of input/output nodes and the first common node;
      a fourth pass band configured to pass RF receive signals within the third operating band between the first common node and a fourth one of the first plurality of input/output nodes; and wherein the first RF multiplexer circuitry is configured to attenuate signals outside of the first pass band, the second pass band, the third pass band, and the fourth pass band; and second RF multiplexer circuitry coupled between a second common node and a second plurality of input/output nodes, wherein a filter response of the second RF multiplexer circuitry includes:
- a fifth pass band configured to pass RF receive signals within the first operating band and RF receive signals within the second operating band between the second common node and a first one of the second plurality of input/output nodes;
- a sixth pass band configured to pass RF transmit signals within the second operating band between a second one of the second plurality of input/output nodes and the second common node;
  - a seventh pass band configured to pass RF receive signals within the third operating band between the second common node and a third one of the second plurality of input/output nodes; and
  - wherein the second RF multiplexer circuitry is configured to attenuate signals outside of the fifth pass band, the sixth pass band, and the seventh pass band.

2. The RF front end circuitry of claim 1 wherein:
the first operating band is long term evolution (LTE) band 12;
the second operating band is LTE band 13; and
the third operating band is one of LTE band 5 and LTE band 26.

3. The RF front end circuitry of claim 1 wherein:
the first pass band is between about 699 MHz and 716 MHz;
the second pass band is between about 729 MHz and 756 MHz;
the third pass band is between about 814 MHz and 849 MHz;
the fourth pass band is between about 859 MHz and 894 MHz;
the fifth pass band is between about 729 MHz and 756 MHz;
the sixth pass band is between about 777 MHz and 787 MHz; and
the seventh pass band is between about 859 MHz and 894 MHz.

4. The RF front end circuitry of claim 1 wherein a receive band of the first operating band includes a receive band edge that is within 10 MHz of a receive band edge of the second operating band.

5. The RF front end circuitry of claim 1 wherein:
the first RF multiplexer circuitry comprises:
- a first filter configured to provide the first pass band;
- a second filter configured to provide the second pass band;
- a third filter configured to provide the third pass band; and
- a fourth filter configured to provide the fourth pass band; and the second RF multiplexer circuitry comprises:
- a fifth filter configured to provide the fifth pass band;
- a sixth filter configured to provide the sixth pass band; and
- a seventh filter configured to provide the seventh pass band.

6. The RF front end circuitry of claim 5 wherein each one of the first filter, the second filter, the third filter, the fourth filter, the fifth filter, the sixth filter, and the seventh filter comprise one of a bulk acoustic wave (BAW) filter, a surface acoustic wave (SAW) filter, and a lumped LC filter.

7. The RF front end circuitry of claim 1 further comprising:
a first antenna coupled to the first common node;
a second antenna coupled to the second common node; and
transceiver circuitry coupled to each one of the first plurality of input/output nodes and the second plurality of input/output nodes.

8. The RF front end circuitry of claim 7 wherein, in a first carrier aggregation mode of operation, the transceiver circuitry is configured to:
provide an RF transmit signal within the first operating band at the first one of the first plurality of input/output nodes;
process an RF receive signal within the first operating band received at the second one of the first plurality of input/output nodes;
process an RF receive signal within the third operating band received at the fourth one of the first plurality of input/output nodes;
process an RF receive signal within the first operating band received at the first one of the second plurality of input/output nodes; and
process an RF receive signal within the third operating band received at the third one of the second plurality of input/output nodes.

9. The RF front end circuitry of claim 8 wherein, in a second carrier aggregation mode of operation, the transceiver circuitry is configured to:
process an RF receive signal within the second operating band received at the second one of the first plurality of input/output nodes;
provide an RF transmit signal within the third operating band to the third one of the first plurality of input/output nodes;
process an RF receive signal within the third operating band received at the fourth one of the first plurality of input/output nodes;
process an RF receive signal within the second operating band received at the first one of the second plurality of input/output nodes; and
process an RF receive signal within the third operating band received at the third one of the second plurality of input/output nodes.

10. The RF front end circuitry of claim 9 wherein:
the first operating band is long term evolution (LTE) band 12;
the second operating band is LTE band 13; and
the third operating band is LTE band 26.

11. The RF front end circuitry of claim 9 further comprising antenna switching circuitry coupled between the first common node, the second common node, the first antenna, and the second antenna, and configured to selectively couple the first common node to one of the first antenna and the second antenna and selectively couple the second common node to a different one of the first antenna and the second antenna.

12. Radio frequency (RF) front end circuitry comprising:
first radio frequency (RF) multiplexer circuitry coupled between a first common node and a first plurality of input/output nodes and comprising:
a first filter coupled between a first one of the first plurality of input/output nodes and the first common node and configured to pass RF transmit signals within a first operating band while attenuating other signals;

a second filter coupled between a second one of the first plurality of input/output nodes and the first common node and configured to pass RF receive signals within the first operating band while attenuating other signals;

a third filter coupled between a third one of the first plurality of input/output nodes and the first common node and configured to pass RF receive signals within a second operating band while attenuating other signals;

switching circuitry coupled between the second filter, the third filter, and the first common node and configured to selectively couple one of the second filter and the third filter to the first common node;

a fourth filter coupled between a fourth one of the first plurality of input/output nodes and the first common node and configured to pass RF transmit signals within a third operating band while attenuating other signals; and a fifth filter coupled between a fifth one of the first plurality of input/output nodes and the first common node and configured to pass RF receive signals within the third operating band while attenuating other signals; and second RF multiplexer circuitry coupled between a second common node and a second plurality of input/output nodes and comprising:

a sixth filter coupled between a first one of the second plurality of input/output nodes and the second common node and configured to pass RF receive signals within the first operating band and RF receive signals within the second operating band while attenuating other signals;

a seventh filter coupled between a second one of the second plurality of input/output nodes and the second common node and configured to pass RF transmit signals within the second operating band while attenuating other signals; and an eighth filter coupled between a third one of the second plurality of input/output nodes and the second common node and configured to pass RF receive signals within the third operating band while attenuating other signals.

13. The RF front end circuitry of claim 12 wherein:
the first operating band is long term evolution (LTE) band 12;
the second operating band is LTE band 13; and
the third operating band is one of LTE band 5 and LTE band 26.

14. The RF front end circuitry of claim 12 wherein a receive band of the first operating band includes a receive band edge that is within 10 MHz of a receive band edge of the second operating band.

15. The RF front end circuitry of claim 12 wherein each one of the first filter, the second filter, the third filter, the fourth filter, the fifth filter, the sixth filter, the seventh filter, and the eighth filter comprise one of a bulk acoustic wave (BAW) filter, a surface acoustic wave (SAW) filter, and a lumped LC filter.

16. The RF front end circuitry of claim 12 further comprising:
a first antenna coupled to the first common node;
a second antenna coupled to the second common node; and
transceiver circuitry coupled to each one of the first plurality of input/output nodes and the second plurality of input/output nodes.

17. The RF front end circuitry of claim 16 wherein, in a first carrier aggregation mode of operation, the second filter is coupled to the first common node and the transceiver circuitry is configured to:
provide an RF transmit signal within the first operating band at the first one of the first plurality of input/output nodes;
process an RF receive signal within the first operating band received at the second one of the first plurality of input/output nodes;
process an RF receive signal within the third operating band received at the fourth one of the first plurality of input/output nodes;
process an RF receive signal within the first operating band received at the first one of the second plurality of input/output nodes; and
process an RF receive signal within the third operating band received at the third one of the second plurality of input/output nodes.

18. The RF front end circuitry of claim 17 wherein, in a second carrier aggregation mode of operation, the third filter is coupled to the first common node and the transceiver circuitry is configured to:
process an RF receive signal within the second operating band received at the second one of the first plurality of input/output nodes;
provide an RF transmit signal within the third operating band to the third one of the first plurality of input/output nodes;
process an RF receive signal within the third operating band received at the fourth one of the first plurality of input/output nodes;
process an RF receive signal within the second operating band received at the first one of the second plurality of input/output nodes; and
process an RF receive signal within the third operating band received at the third one of the second plurality of input/output nodes.

19. The RF front end circuitry of claim 18 wherein:
the first operating band is long term evolution (LTE) band 12;
the second operating band is LTE band 13; and
the third operating band is LTE band 26.

20. The RF front end circuitry of claim 18 further comprising antenna switching circuitry coupled between the first common node, the second common node, the first antenna, and the second antenna, and configured to selectively couple the first common node to one of the first antenna and the second antenna and selectively couple the second common node to a different one of the first antenna and the second antenna.

* * * * *